United States Patent [19]

Schmookler

[11] Patent Number: 5,129,066
[45] Date of Patent: Jul. 7, 1992

[54] BIT MASK GENERATOR CIRCUIT USING MULTIPLE LOGIC UNITS FOR GENERATING A BIT MASK SEQUENCE

[75] Inventor: Martin S. Schmookler, Austin, Tex.

[73] Assignee: International Business Machines Corporation, Armonk, N.Y.

[21] Appl. No.: 387,412

[22] Filed: Jul. 31, 1989

Related U.S. Application Data

[63] Continuation of Ser. No. 97,892, Sep. 17, 1987, abandoned.

[51] Int. Cl.$^5$ .............................................. G06F 9/00
[52] U.S. Cl. ............................ 395/375; 395/DIG. 1; 395/775; 364/259.7; 364/947.4; 364/DIG. 1
[58] Field of Search ................. 395/DIG. 1, DIG. 2, 395/800, 775, 375

[56] References Cited

U.S. PATENT DOCUMENTS 4,087,811  2/1976  Weinberger ............................ 341/95
4,569,016  2/1986  Hao et al. ............................. 364/200

OTHER PUBLICATIONS

Barrett et al., "Four-Bit Look-Ahead Mask Generator", IBM Technical Disclosure Bulletin, vol. 26, No. 1 (Jun. 1983), pp. 197–198.
C. B. Steiglitz, "Mask Generator", IBM Technical Bulletin, vol. 23, No. 1 (Jun. 1980), pp. 149–150.

Primary Examiner—Thomas C. Lee
Assistant Examiner—Robert B. Harrell
Attorney, Agent, or Firm—Thomas E. Tyson

[57] ABSTRACT

A mask generation circuit for generating a bit mask sequence of $2^N$ bits including a first logic circuit having a single level of combinational logic for receiving an N bit indication of the bit mask sequence and for providing an output of $2^q$ plus $2^P$ signals to a second logic circuit that includes $2^P$ identical logical units of not more than 2 levels of combinational logic each connected in parallel and each unit including $2^q$-1 repeating circuit sets. These units are connected to receive the signals from the first logic circuit and provide therefrom the ibt mask sequence. In one embodiment of the present invention, a bit mask generator is provided that includes a first edge generator circuit and a second edge generator circuit where each of the edge generator circuits are provided N bit indications indicating the binary digital sequence transition point. The output of the edge generator are provided to a combinational logic circuit that combines these two edge bit mask sequences to provide the mask sequence.

15 Claims, 5 Drawing Sheets

BIT MASK GENERATOR CIRCUIT USING MULTIPLE LOGIC UNITS FOR GENERATING A BIT MASK SEQUENCE This is a continuation of application Ser. No. 07/097,892, now abandoned, filed Sep. 17, 1987.

BACKGROUND OF THE INVENTION

1. Field of the Invention

This invention relates to circuitry for a digital data processing system and more particularly to an apparatus for providing a specified binary sequence termed a mask.

2. Description of the Related Art Including Information Disclosed under 37 CFR 1-97-1.99

A mask is a predefined binary sequence. A mask is used to extract specific bits from a data word or another data sequence while suppressing other bits in the word or sequence. An example of a mask would be a binary sequence containing a series of 1's surrounded by 0's. When this mask is ANDed with some other data word, the data in this other data word at the bit locations of the 1's in the mask word will be exposed. The bits and the data word at the locations corresponding to the 0 bit locations in the mask word will be suppressed.

This invention provides a mask generation unit that specifies a mask of 1's surrounded by 0's or 0's surrounded by 1's.

U.S. Pat. No. 4,087,811 entitled "Threshold Decoder", discloses a type of mask generator designed with the purpose of minimizing the total number of gates. However, using the technique of this patent, a considerable amount of wiring is required.

U.S. Pat. No. 4,569,016 entitled "Mechanism For Implementing One Machine Cycle Executable Mask and Rotate Instructions In A Primitive Instruction Set Computing System" discloses a circuit for performing full shift, merge, insert and bit alignment functions within a single machine operating cycle. However, this patent does not disclose the specific circuitry embodiment of the mask generation unit. This patent does, however, discuss the importance of the execution of an instruction in a single machine operating cycle. The present invention is intended to perform the mask generation function within a single machine cycle operation.

*IBM Technical Disclosure Bulletin*, Vol. 24, No. 10A, March 1985, pages 5696–5698, entitled "Mask Generator for 32 Bit Microprocessors" discloses mask generation using an eleven bit instruction.

*IBM Technical Disclosure Bulletin*, Vol. 26, No. 1, June 1983, pages 197–198, entitled "Four-Bit Look-Ahead Mask Generator", discloses a look-ahead mask generator that provides improved access time.

*IBM Technical Disclosure Bulletin*, Vol. 23, No. 1, June 1980, pages 149–150, entitled "Mask Generator", discloses a mask generating circuit using a bit shifter.

It is an object of the present invention to provide a mask generation unit that minimizes the layout of circuitry in a field effect transistor environment.

SUMMARY OF THE INVENTION

In accordance with the present invention, a bit mask generator circuit is provided for generating a bit mask sequence of $2^N$ bits. The bit mask generator circuit includes a first logic circuit having a single level of combinational logic that receives an N bit indication of the bit mask sequence and provides $2^q$ plus $2^p$ output signals where $N=q+p$. A second logic circuit is connected to the first logic circuit to receive the output signals from the first logic circuit. The second logic circuit further includes $2^p$ identical logic circuit units of not more than two levels of combinational logic each that are connected in parallel and include $2^q-1$ repeating circuit sets that received the $2^q$ and $2^p$ signals and provide the bit mask sequence.

In one embodiment of the present invention, a bit mask generator circuit is provided that generates a bit mask sequence having a binary digital sequence of $2^N$ bits. This circuit includes a first edge generator that receives a first N bit indication designating a first binary digital sequence having a bit value transition at a specified location. The first edge generator includes a first logic circuit, of a single level of combinational logic, that receives the N bit indication and provides $2^q$ plus $2^p$ signals where $N=q+p$. A second logic circuit consisting of $2^p$ identical logical units, each not more than two levels of combinational logic, connected in parallel and including $2^q-1$ repeating circuit sets, and are connected to receive the $2^q$ plus $2^p$ signals from the first logical circuit and provides a first edge bit mask sequence. The bit mask generator circuit further includes a second edge generator that is similar to the first edge generator including a first logic circuit that receives an N bit indication of a binary sequence designating a digital sequence bit value transition location. The first logic circuit is connected to a second logic circuit having $2^p$ identical logical units of not more than two levels of combinational logic each of the units connected in parallel and including $2^q-1$ repeating circuit sets, for receiving the $2^q$ plus $2^p$ signals from the second edge generator circuit first logic circuit for providing the second edge mask sequence. The bit mask generator circuit further includes a combinational logic circuitry connected to both the first edge generator circuit and second edge generator circuit to combine the first edge bit mask sequence and the second edge bit mask sequence to provide the bit mask sequence output.

BRIEF DESCRIPTION OF THE DRAWING

The novel features believed characteristic of the invention are set forth in the appended claims. The invention itself, however, as well as other features and advantages thereof, will be best understood by reference to the following description of the preferred embodiment, when read in conjunction with the accompanying figures, wherein:

DESCRIPTION OF THE PREFERRED EMBODIMENT

A mask generator provides a sequence pattern of binary digits, i.e., 1's and 0's as an output. In the following description an edge mask sequence is described as including a sequence of 1's followed by a sequence of 0's or vice versa. It should be apparent that a single edge mask circuit is a mask generator in the broadest terms. However, another type of sequence may be required having a sequence of 1's surrounded by a sequence of zero's or vice versa.

Figure 1:
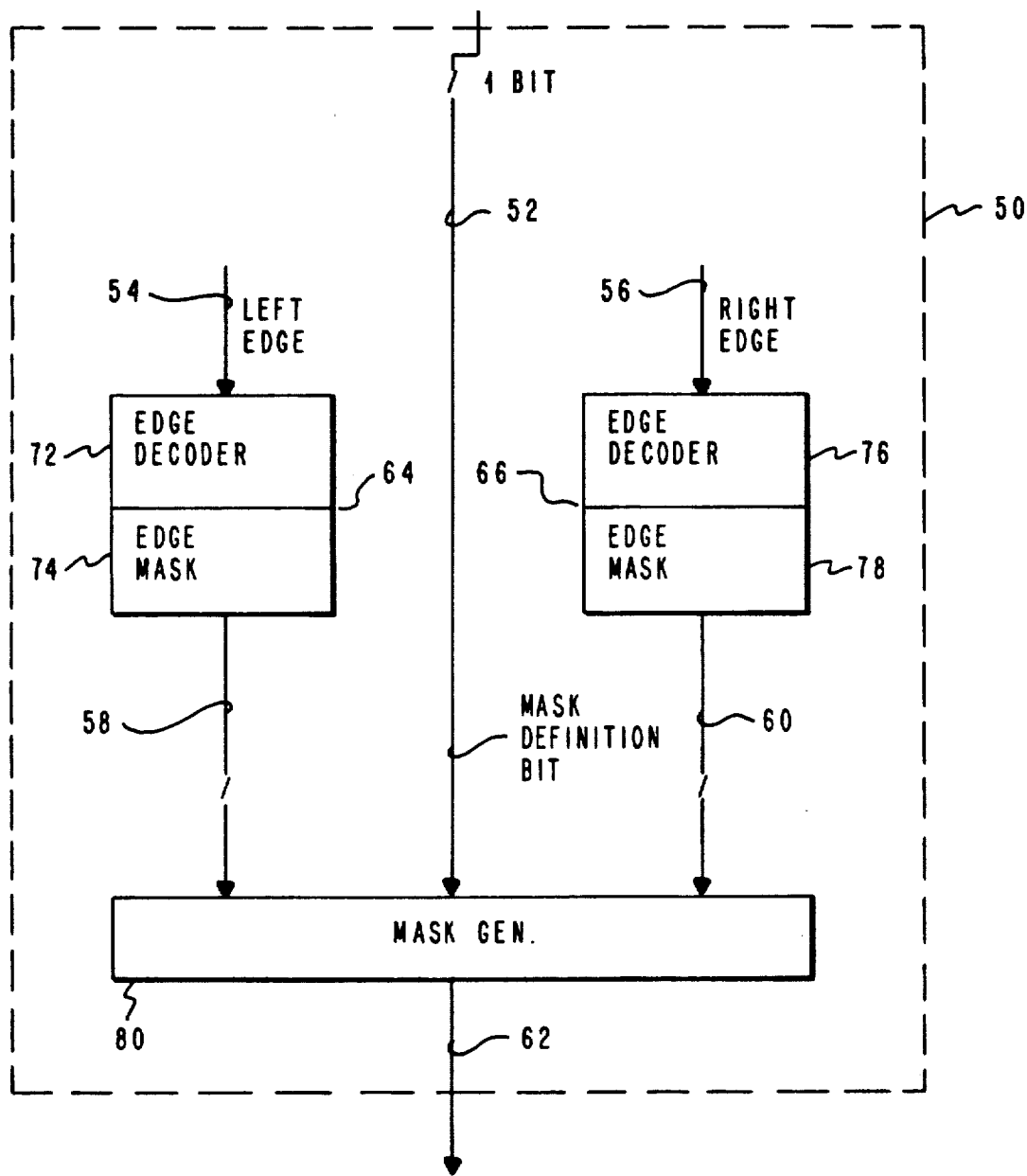
FIG. 1 is a block diagram of the mask generator circuit.

FIG. 1 is a block diagram of a mask generation circuit 50. This mask generation circuit will provide a sequence of 1's surrounded by a sequence of 0's or alternatively a sequence of 0's surrounded by a sequence of 1's. The polarity of the mask is provided by a single bit signal on line 52. The location of the sequence transition for the left edge is provided by a multi-bit signal on lines 54. A multi-bit signal on lines 56 provides the location of this right edge bit sequence transition. The left edge mask generation circuit 64 consists of two components: an edge decoder circuit 72 and a left edge mask circuit 74. Similarly, the right edge mask generation circuit 66 consists of an edge decoder circuit 76 and a right edge mask circuit 78. The left edge mask bit sequence is provided on multi-bit lines 58 to the mask generator 80. Likewise, the right edge mask sequence is provided on the multi-bit lines 60 to the mask generator 80. The mask generator 80 includes combinational logic that combines the left edge mask on lines 58 with the right edge mask on lines 60 to provide the mask sequence on lines 62.

Figure 2:
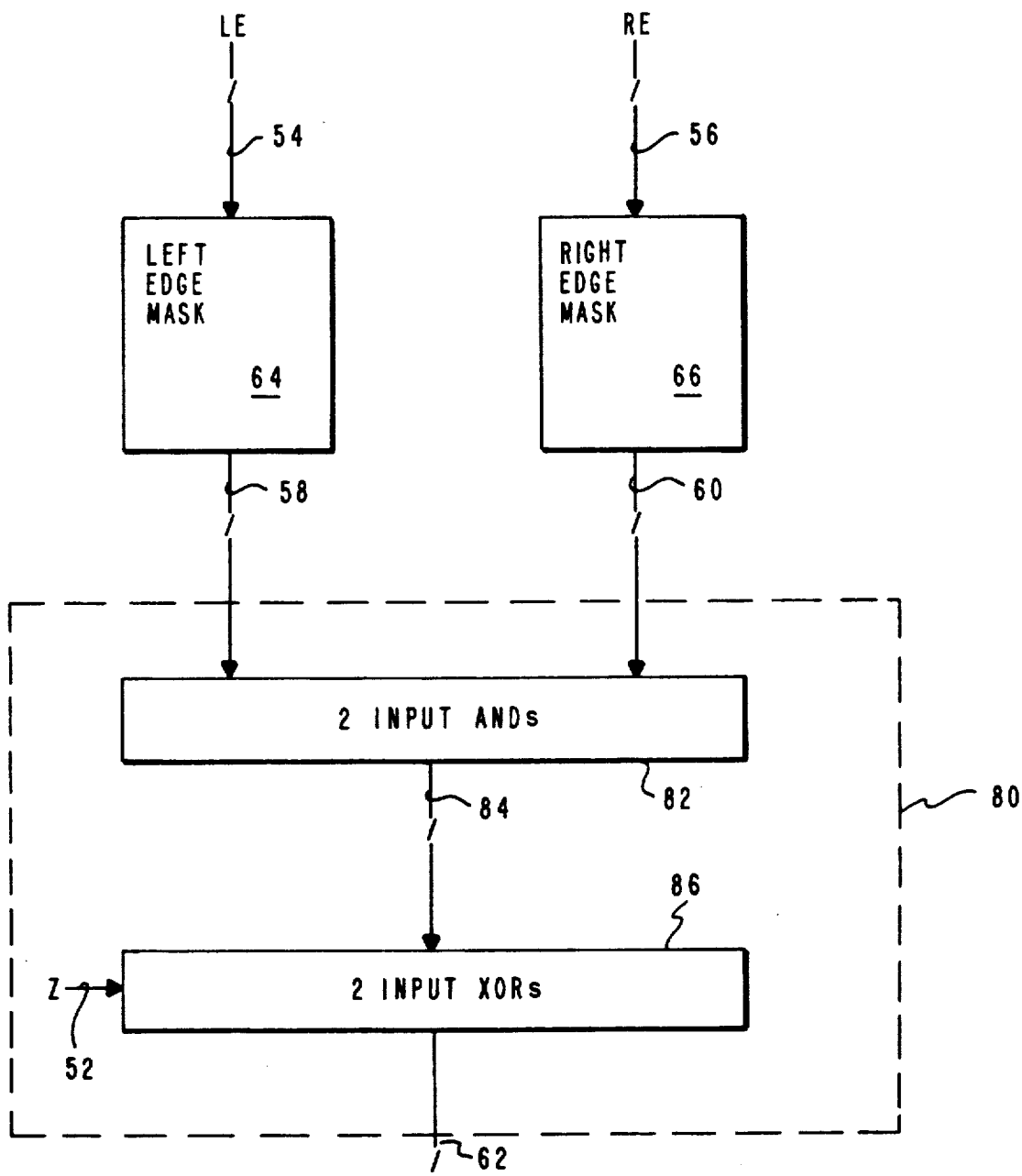
FIG. 2 is a second block diagram of a mask generation circuit illustrating the combinational logic for combining the left and right mask.

FIG. 2 illustrates a block diagram of the mask generation circuit including the left edge mask generation 64 and the right edge mask generation 66 connected to the mask generation circuit 80 that includes a series of two input AND gates 82 that are connected via multi-bit lines 84 to a set of two input EXCLUSIVE OR gates 86 to provide the mask sequence on line 62. The two input EXCLUSIVE OR gates 86 include one input connected to the AND gates in stage 82 and the other inputs of each of the two way EXCLUSIVE OR gates 45 collectively connected to line 52. Line 52 specifies the polarity of the mask bit sequence (i.e., 1's surrounded by 0's or 0's surrounded by 1's).

Figure 3:
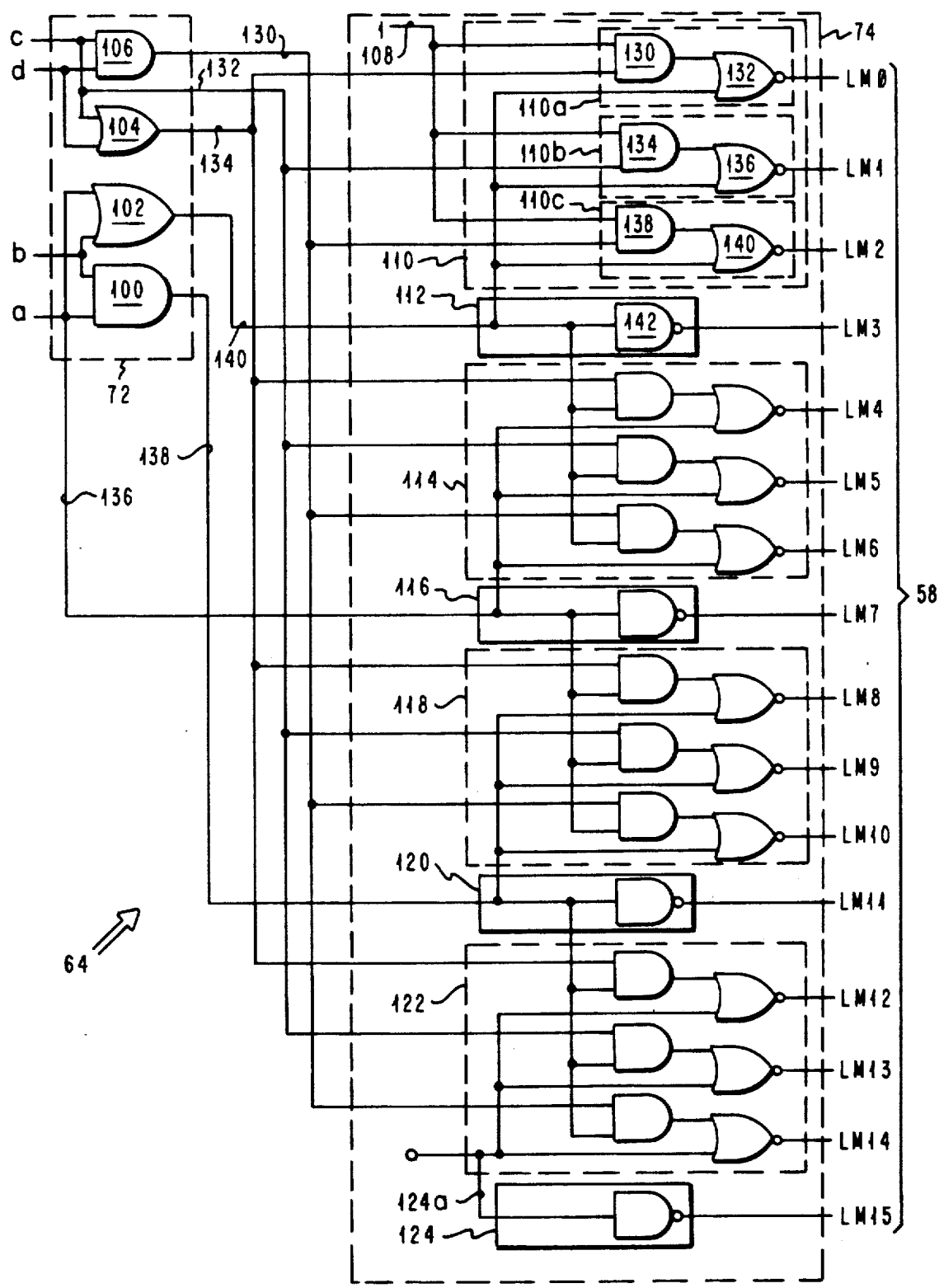
FIG. 3 is a schematic diagram of the left edge mask generation circuit.

FIG. 3 is a schematic illustration of the invention. Specifically, FIG. 3 illustrates the left edge mask generation circuit for a 16 bit sequence. In FIG. 3, the four-bit sequence a, b, c, d designates the left edge mask sequence LM0–LM15. The edge decoder circuit 72 consists of a single level of logic. This logic includes AND gates 100 and 106 and OR gates 102 and 104. The left edge mask circuit 74 consists of four identical logic units 110, 114, 118, and 122. These logic units include two levels of combinational logic. For example, logical unit 110 consists of AND gates 130, 134 and 138 and NOR gates 132, 136 and 140. Logical unit 110 illustrates the logical circuit sets 110a, 110b, 110c. Note that all of the logical units 110, 114, 118 and 122 are identical in their logical contents and their wiring. Inverters 112, 116, 120 and 124 are interleaved between the logical units 110, 114, 118 and 122. Of course, the inverter units 112, 116, and 120 are single level combinational logics such as the NAND gate 142. The left edge mask bit position LM15 is provided by inverter 124 which is connected to a logical 0. Likewise, input 108 to the logical unit 110 is tied to a logical 1.

From this invention, it should be apparent to those skilled in the art that any edge mask bit sequence consisting of a number that is a power of 2 may be produced by a repeating combination of the illustrated logical units such as 110 including repeating circuit sets such as 110a, 110b and 110c, and the inverter units such as 112. By arranging the edge mask generation logic in this manner, the complexity of the combinational circuitry and the wiring of the edge mask generator itself is greatly simplified.

In FIG. 3, N=4 so the circuit 64 provides a sequence of $2^N$ or 16 bits as an output on lines 58. Circuit 64 includes the edge decoder circuit 72 that provides signals 130, 132 and 134 and signals 136, 138 and 140. Additionally, circuit 72 provides a logical 1 signal on line 108 and a logical 0 on line 124a. Therefore, if $N=p+q$, for the example in FIG. 3, p =2 and q=2 resulting in $2^p$ plus $2^q$ (or $2^2$ plus $2^2$) output signals consisting of signals 130, 132, 134 and 108, and 136, 138, 140 and 124, respectively. The q and the p parameters may be varied by the design. However, the specification of the q and p parameters determine the second level of logic 74. p relates to the number of logical units such as 110, 114, 118, and 122. q relates to the number of repeating circuit sets (such as 110a, 110b and 110c) within each logical unit. Actually $2^q-1$ repeating circuit sets are included in the $2^p$ logical units. This design minimizes the wiring and simplifies circuit layout on a semiconductor device.

Figure 4:
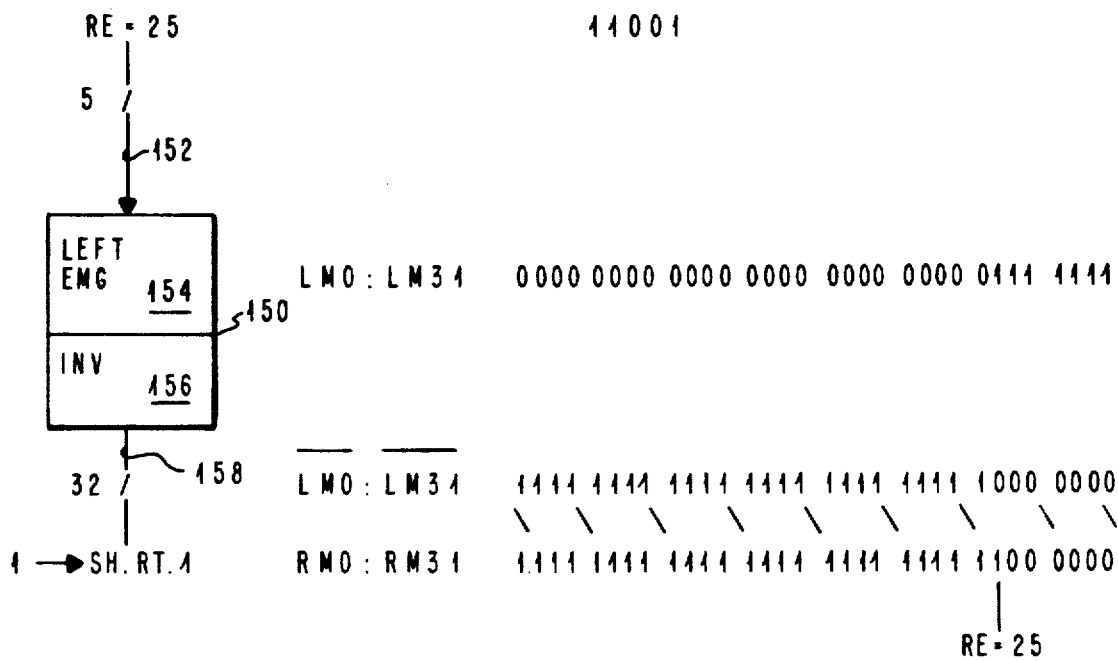
FIG. 4 is an embodiment for a right edge mask generation circuit implemented with a left edge mask generation circuit and an inverter.

FIG. 4 illustrates a further embodiment to provide a right edge mask sequence from the same circuitry as for the left edge mask generation circuit. In FIG. 4, a 32 bit mask is being generated. A 5 bit indication of the bit transition is input on line 152 to the left edge mask generation circuit 154. The output of the left edge mask generation circuit 154 is provided to a series of inverters 156 to provide the 32 bit output on line 158. The actual connection of the inverters 156 would include a single inverter per line LM0 through LM30 on the output of the left edge mask generator 154 to produce RM1 through RM31. RM0 is coupled to a logical 1. The binary output sequence is illustrated in FIG. 4.

Figure 5:
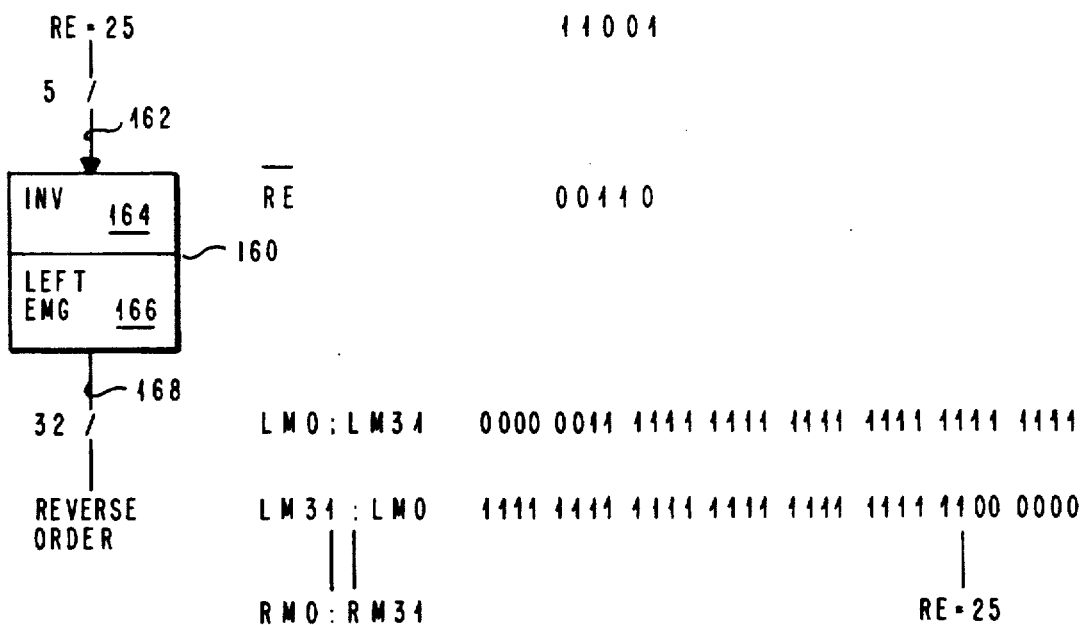
FIG. 5 is an alternative embodiment of the right edge mask generation circuit implemented with a left edge mask generation circuit and an inverter.

An additional embodiment to provide a right edge mask sequence is illustrated in FIG. 5. In FIG. 5 the right edge mask circuit 160 consists of a set of inverters 164 that receive the 5 bit mask bit sequence transition indication on line 162. The output of the inverters 164 are connected to the left edge mask generation circuit 166 to provide a 32 bit output on line 168. The actual binary sequence is illustrated in FIG. 5. In FIG. 5, the inverters 164 would be included on the input of the 5 bit indication of the edge transition (see FIG. 3). Obviously, the number of inverters for FIG. 5 would be less than the number of inverters required for FIG. 4. The right edge mask requires the signals to be in reverse order to that of a left edge mask, therefore, the circuit 166 should be a mirror image of the circuit used for generating the left edge mask.

Figure 6:
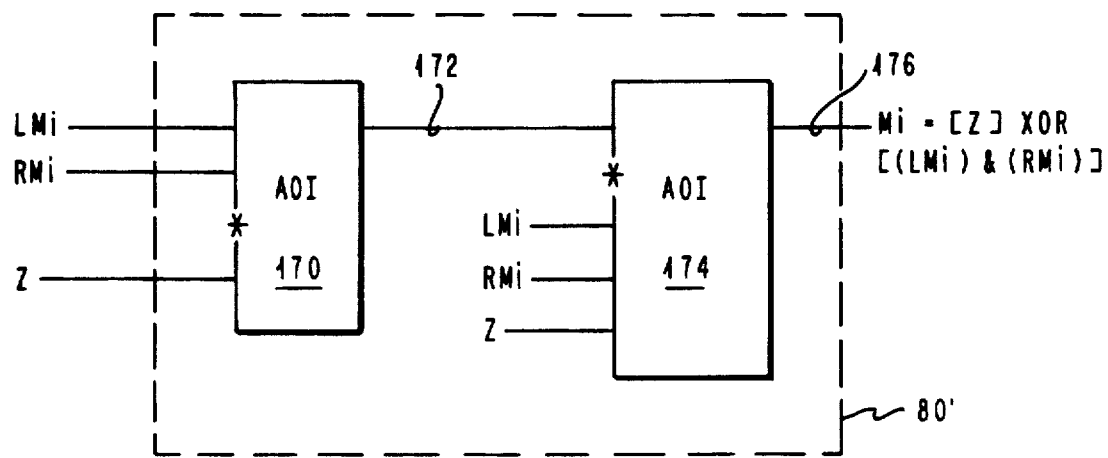
FIG. 6 is a block diagram of an alternative embodiment for the combinational logic to combine the left edge mask generation sequence with the right edge mask generation sequence.

Returning to FIG. 1, the mask generation circuit can either include a stage of two-input AND gates 82 (FIG. 2) connected to a stage of two-input EXCLUSIVE OR gates 84 (FIG. 2) or alternatively a combination of two stages of combinational logic as shown in FIG. 6. In FIG. 6, the first stage 170 consist of AND/OR and inverter logic connected by line 172 to a second stage 174 also consisting of AND/OR and inverter logic.

Figure 7:
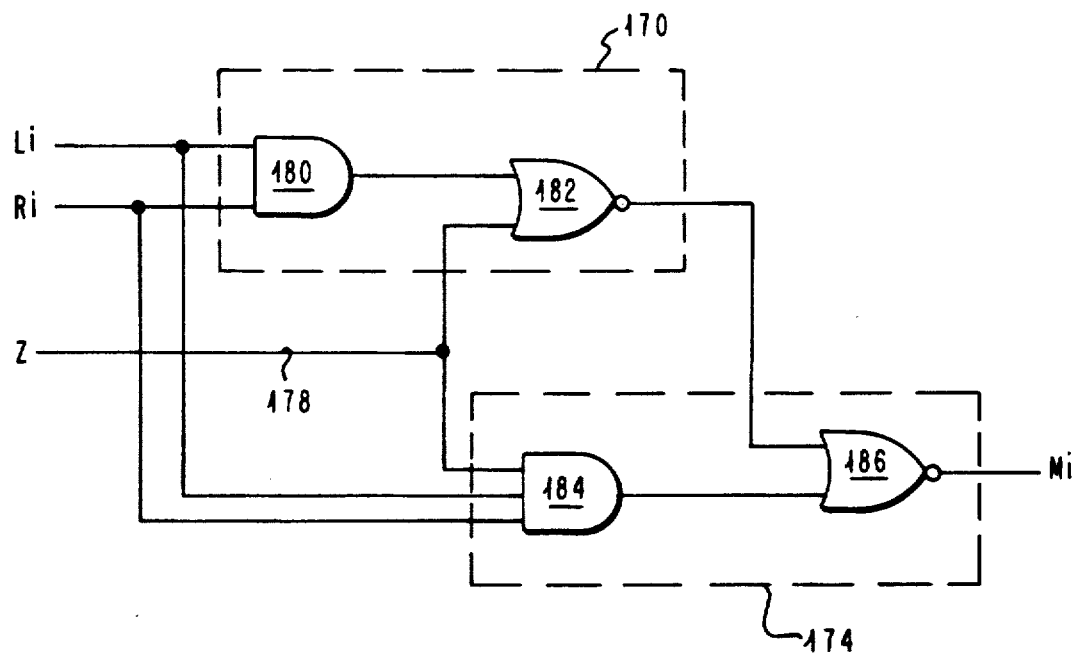
FIG. 7 is a schematic diagram of the combinational logic in FIG. 6.

Stage 174 provides the output on line 176. FIG. 7 illustrates a single binary position of logic for stages 170 and 174. Stage 170 consist of an AND gate 180 and a NOR gate 182. Stage 174 consist of an AND gate 184 and an OR gate 186. The Z input on line 178 provides the polarity of the sequence that is output.

Although the invention has been described with reference to this specific embodiment, this description is not meant to be construed in a limiting sense. Various modifications of the disclosed embodiment, as well as other embodiments of the invention, will become apparent to those persons skilled in the art upon reference to the description of this invention. It is, therefore, contemplated that the appended claims will cover any such modifications or embodiments as fall within the true scope of the invention.

I claim:

1. A bit mask generator circuit for generating a bit mask sequence of $2^N$ bits, said circuit comprising:
   first logic means, including a single level of combinational logic, for receiving an N bit indication of the bit mask sequence and for providing $2^q-1$ and $2^p-1$ signals, wherein $N=q+p$ and p and q are integers where p is equal to or greater than 1 and q is equal to or greater than 1; and
   second logic means, including $2^p$ identical logic circuit units of not more than two levels of combinational logic each, said units connected in parallel and including $2^q-1$ repeating circuit sets, for receiving said $2^q-1$ and $2^p-1$ signals and providing said bit mask sequence, each of the $2^p-1$ signals being connected to a unique pair of adjacent $2^p$ identical logic circuit units and all of the $2^q-1$ signals connected to each of the $2^p$ identical logic circuit units.

2. A bit mask generator circuit according to claim 1 wherein said second logic means further includes a plurality of single level combinational logic connected in parallel with said identical logic circuit units.

3. A bit mask generator circuit according to claim 2 wherein said second logic means single level combinational logic is connected to receive $2^p-1$ signals.

4. A bit mask generator circuit according to claim 3 wherein said second logic means single level combinational logic is interleaved in parallel between said $2^p$ identical logic circuit units.

5. An edge bit mask generator circuit for generating a mask of $2^N$ bits in length, said generator comprising:
   a first logic means for receiving N bits of information designating a bit mask sequence and providing $2^q-1$ and $2^p-1$ signals, wherein $N=q+p$ and p and q are integers where p is equal to or greater than 1 and q is equal to or greater than 1; and
   a second logic means including $2^p$ identical logic circuit units of not more than two levels of combinational logic, said units connected in parallel and including $2^q-1$ repeating circuit sets, for receiving said $2^q-1$ and $2^p-1$ signals and providing the bit mask sequence, each of the $2^p-1$ signals being connected to a unique pair of adjacent $2^p$ identical logic circuit units and all of the $2^q-1$ signals connected to each of the $2^p$ identical logic circuit units.

6. A bit mask generator circuit according to claim 5 wherein said N bits designates a location of a binary digit value transition in said bit mask sequence.

7. A bit mask generator circuit according to claim 6 wherein said second logic means further includes a plurality of single level combinational logic connected in parallel with said identical logic circuit units.

8. A bit mask generator circuit according to claim 7 wherein said second logic means single level combinational logic is connected to receive $2^p-1$ signals.

9. A bit mask generator circuit according to claim 8 wherein said single level combinational logic is interleaved in parallel between said $2^p$ identical logic circuit units.

10. A bit mask generator circuit for generating a bit mask sequence having a binary digit sequence of $2^N$ bits, said circuit comprising:
    a first edge generator means for receiving a first N bit indication of a first edge binary digit sequence transition and including a first logic means, having a single level of combinational logic, for receiving the N bit indication and for providing $2^q-1$ and $2^p-1$ signals, wherein $N=q+p$ and p and q are integers where p is equal to or greater than 1 and q is equal to or greater than 1; and a second logic means, having $2^p$ identical logic circuit units of not more than two levels of combinational logic each, said units connected in parallel and including $2^q-1$ repeating circuit sets interleaved parallel with $2^p$ single level logic means, for receiving said $2^q-1$ and $2^p-1$ signals and providing a first edge bit binary digit sequence, each of the $2^p-1$ signals being connected to a unique pair of adjacent $2^p$ identical logic circuit units and all of the $2^q-1$ signals connected to each of the $2^p$ identical logic circuit units;
    a second edge generator means for receiving a second N bit indication of a second edge binary digit sequence transition and including a third logic means, identical to said first logic means, for receiving the second N bit indication, a fourth logic means identical to said second logic means and, further, including inverter logic, for providing a second edge bit binary digit sequence; and
    combinational logic means for receiving said first and second edge bit binary digit sequences and providing said bit mask sequence therefrom.

11. A bit mask generator circuit according to claim 10 wherein said combinational logic includes an input signal designating a polarity of binary digits in the bit mask sequence.

12. A bit mask generator circuit according to claim 11 wherein said combinational logic means includes Exclusive Or logic.

13. A bit mask generator circuit for generating a bit mask sequence having a binary digit sequence of $2^N$ bits, said circuit comprising:
    a first edge generator means for receiving a first N bit indication of a first edge binary digit sequence transition and including a first logic means, having a single level of combinational logic, for receiving the N bit indication and for providing $2^q-1$ and $2^p-1$ signals, wherein $N=q+p$ and p and q are integers where p is equal to or greater than 1 and q is equal to or greater than 1; and a second logic means, having $2^p$ identical logic circuit units of not more than two levels of combinational logic each, said units connected in parallel and including $2^q-1$ repeating circuit sets interleaved parallel with $2^p$ single level logic means, for receiving said $2^q$ and $2^p$ signals and providing a first edge binary digit sequence, each of the $2^p-1$ signals being connected to a unique pair of adjacent $2^p$ identical logic circuit units and all of the $2^q-1$ signals connected to each of the $2^p$ identical logic circuit units;

a second edge generator means for receiving a second N bit indication of a second edge binary digit sequence transition and including inverter logic means connected to receive said second N bit indication and providing signals to a third logic means, identical to said first logic means, which provides signals to a fourth logic means identical to said second logic means for providing a second edge binary digit sequence; and combinational logic means for receiving said first and second edge bit mask sequences and providing said bit mask sequence therefrom.

14. A bit mask generator circuit according to claim 13 wherein said combinational logic includes an input signal designating a polarity of binary digits in the bit mask sequence.

15. A bit mask generator circuit according to claim 14 wherein said combinational logic means includes Exclusive Or logic.

* * * * *